(12) United States Patent
Zhou

(10) Patent No.: US 11,087,492 B2
(45) Date of Patent: Aug. 10, 2021

(54) METHODS FOR IDENTIFYING LOCATION OF AUTOMATED GUIDED VEHICLES ON A MAPPED SUBSTRATE

(71) Applicant: ISVision America, Bloomfield Hills, MI (US)

(72) Inventor: Lei Zhou, Bloomfield Hills, MI (US)

(73) Assignee: ISVision America, Bloomfield Hills, MI (US)

( * ) Notice: Subject to any disclaimer, the term of this patent is extended or adjusted under 35 U.S.C. 154(b) by 0 days.

(21) Appl. No.: 16/982,105

(22) PCT Filed: Mar. 21, 2019

(86) PCT No.: PCT/US2019/023429
§ 371 (c)(1),
(2) Date: Sep. 18, 2020

(87) PCT Pub. No.: WO2019/183393
PCT Pub. Date: Sep. 26, 2019

(65) Prior Publication Data
US 2021/0134008 A1   May 6, 2021

Related U.S. Application Data

(60) Provisional application No. 62/645,916, filed on Mar. 21, 2018.

(51) Int. Cl.
*G06T 7/73* (2017.01)
*G01C 21/34* (2006.01)
(Continued)

(52) U.S. Cl.
CPC ............ *G06T 7/74* (2017.01); *G01C 21/3415* (2013.01); *G05D 1/0268* (2013.01); *G06K 9/00208* (2013.01); *G06T 2207/30252* (2013.01)

(58) Field of Classification Search
CPC ........ G06K 2009/4666; G06K 9/0063; G06K 9/00671; G06K 9/00677; G06K 9/46;
(Continued)

(56) References Cited

U.S. PATENT DOCUMENTS 9,037,396 B2   5/2015   Pack et al.
9,329,598 B2   5/2016   Pack et al.
(Continued)

*Primary Examiner* — Ian L Lemieux
(74) *Attorney, Agent, or Firm* — Howard & Howard Attorneys PLLC

(57) ABSTRACT

A method for accurately determining a positioning of an automated guided vehicle relative to a substrate includes scanning a substrate surface of the substrate to produce two or more two-dimensional images, with each respective one of the produced two-dimensional images is associated with a known portion of the substrate surface. The method further includes storing each one of the produced images. The method further includes positioning the automated guided vehicle relative to the substrate surface, and scanning the substrate surface corresponding to the positioned automated guide vehicle to produce a supplemental two-dimensional image. The supplemental image is compared to each of the stored two or more images to accurately determine the position of the vehicle relative to the substrate surface at the position. This information can also be used to drive the automated guided vehicle from the determined position to another known position relative to the substrate surface.

17 Claims, 6 Drawing Sheets

(51) Int. Cl.
  *G05D 1/02* (2020.01)
  *G06K 9/00* (2006.01)
(58) Field of Classification Search
  CPC ...... G06K 9/52; G06K 9/6201; G06K 9/6212; G06K 9/626; G06K 9/6262; G06K 9/6267; G06K 9/00208; G06T 2207/10021; G06T 2207/10024; G06T 2207/10028; G06T 2207/30244; G06T 2207/30252; G06T 7/277; G06T 7/73; G06T 7/74; G06T 7/60; G06T 1/20; G06T 11/203; G06T 11/60; G06T 11/05; G06T 2207/10032; G06T 2207/30204; G06T 3/4038; G01C 21/3415; G05D 1/0268
  See application file for complete search history.

(56) References Cited

U.S. PATENT DOCUMENTS

| | | | |
|---|---|---|---|
| 10,296,814 B1* | 5/2019 | Kumar | G06K 9/6202 |
| 10,339,389 B2* | 7/2019 | Xu | G05D 1/0253 |
| 10,515,458 B1* | 12/2019 | Yakimenko | G06T 17/05 |
| 2008/0234886 A1* | 9/2008 | Richter | G01M 17/0078 701/25 |
| 2011/0010023 A1 | 1/2011 | Kunzig et al. | |
| 2014/0022265 A1 | 1/2014 | Canan et al. | |
| 2014/0350839 A1 | 11/2014 | Pack et al. | |
| 2015/0212521 A1 | 7/2015 | Pack et al. | |
| 2016/0089783 A1 | 3/2016 | Noh et al. | |
| 2016/0278599 A1 | 9/2016 | Seo et al. | |
| 2016/0364884 A1 | 12/2016 | Schultz et al. | |
| 2018/0150972 A1* | 5/2018 | Zhu | G05D 1/0246 |
| 2018/0276847 A1* | 9/2018 | Last | G06K 9/6215 |
| 2019/0145775 A1* | 5/2019 | Cui | G06F 16/29 701/446 |
| 2019/0204093 A1* | 7/2019 | Cantrell | G05D 1/0088 |
| 2019/0220997 A1* | 7/2019 | Asai | G06F 16/29 |
| 2019/0259182 A1* | 8/2019 | Sarukkai | G06K 9/4628 |
| 2019/0265038 A1* | 8/2019 | Ashbrook | G01S 17/89 |
| 2019/0347808 A1* | 11/2019 | Wong | G06T 7/248 |
| 2019/0375103 A1* | 12/2019 | Cui | G06K 9/6273 |
| 2020/0098135 A1* | 3/2020 | Ganjineh | G06F 16/583 |
| 2020/0234062 A1* | 7/2020 | Rogan | G06Q 10/047 |
| 2020/0279395 A1* | 9/2020 | Buda | G01C 21/30 |
| 2020/0327696 A1* | 10/2020 | Habib | G06T 7/80 |
| 2020/0349362 A1* | 11/2020 | Maloney | G06T 7/73 |

\* cited by examiner

FIG. 1
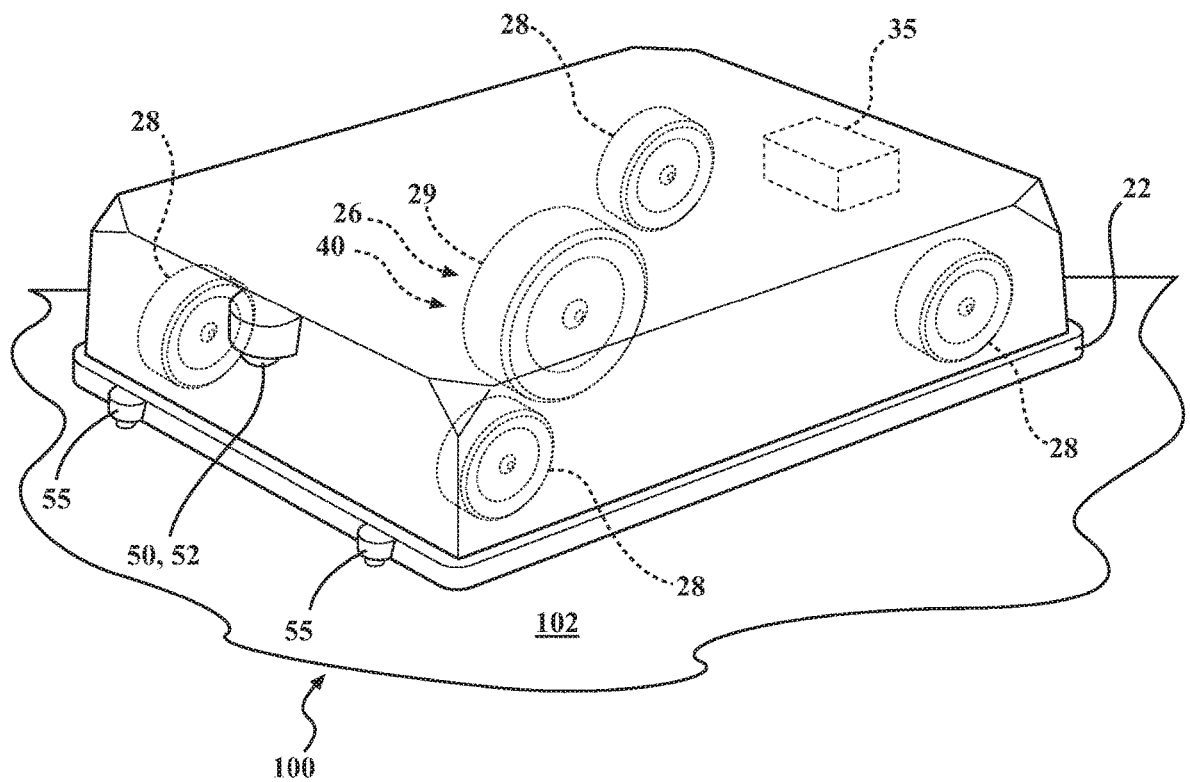
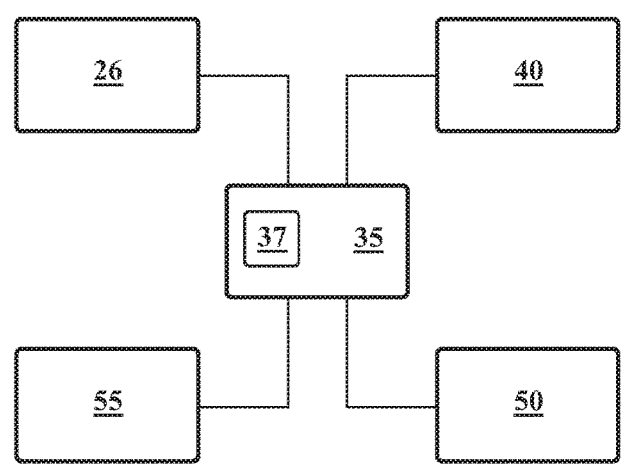
FIG. 2

METHODS FOR IDENTIFYING LOCATION OF AUTOMATED GUIDED VEHICLES ON A MAPPED SUBSTRATE

CROSS-REFERENCE TO RELATED APPLICATIONS

This application is the National Stage of International Patent Application No. PCT/US2019/023429 filed on Mar. 21, 2019, which claims priority to and all advantages of U.S. Provisional Application No. 62/645,916, filed on Mar. 21, 2018, the content of which is incorporated by reference.

BACKGROUND

Automated guided vehicles (AGVs), sometimes referred to as automatic guided vehicles or automated guided carts (AGCs), are self-guided or self-propelled vehicles that are increasingly utilized to transport materials (such as pallets, rolls, racks, carts, containers, and the like) along substrates through designated pickup and delivery routines within a manufacturing or distribution facility for a wide variety of industries.

In general, conventional AGVs follow markers (such as magnetic or colored strips) or wires that are placed in a substrate (typically the floor) in a particularly desired configuration along a particular pickup and delivery route of a manufacturing or distribution facility. Alternatively, or in conjunction therewith, AGVs can also use vision (such as cameras), magnets, or lasers for navigation. Still further, inertial (gyroscopic) navigation or global positioning satellites (GPS) can be utilized in certain applications. Yet still further, 2D barcodes can also be introduced onto the floor or at locations within the facility corresponding to the pickup and delivery route to improve positional accuracy.

However, the accuracy of the positioning of AGVs on a substrate surface along the particular pickup and delivery route, in real time, is inherently limited by the types of devices or technologies described above. Accordingly, the ability of the AGV to correct its positioning along the delivery route, or stop accurately at a predetermined position, in real time is correspondingly inherently limited for the same reasons.

Still further, the accuracy of positioning and movement of the AGV in a particular facility is also limited to a static arrangement within the particular facility. In particular, current systems cannot easily factor in dynamic changes within the facility, and in particular along the pickup and delivery route, that can affect the ability of the AGV to accurately determine its location along the pickup and delivery route. For example, changing configurations along the substrate along the pickup and delivery route, including but not limited to the rearrangement or placement of equipment within the facility. Further, changes to the substrate surface itself, such as through wear or by repair of the substrate, can adversely affect the ability of the AGV to precisely determine its location along the pickup and delivery route in the facility at any given time.

The method and system described herein is designed to improve the accuracy of positioning of the AGV on a substrate, and to allow for dynamic changes to substrate surface of such substrates.

SUMMARY OF THE INVENTION

The present disclosure describes a method for accurately determining a location of an automated guided vehicle positioned relative to a substrate. The method comprises:

prescanning a predefined length and width of a substrate surface of the substrate to produce a series of two or more two-dimensional images, each respective one of said produced series of two or more two-dimensional images corresponding to a different respective location on the substrate surface within the predefined length and width;

associating each one of said produced two or more two-dimensional images with a respective known location on the substrate surface;

storing each one of said produced and associated two-dimensional images; positioning the automated guided vehicle in an unknown location within the predefined length and width relative to the substrate surface;

scanning the substrate surface corresponding to the unknown location to produce a supplemental two-dimensional image; and comparing said produced supplemental two-dimensional image to each of said stored two or more two-dimensional images to determine the location of the positioned automated guided vehicle relative to the substrate.

The present disclosure is also directed a method for controlling the movement of an automated guided vehicle relative to a substrate, with the automated guided vehicle including a sensing device coupled to a controller. This method comprises:

prescanning a predefined length and width of a substrate surface of the substrate to produce a series of two or more two-dimensional images, each respective one of said produced series of two or more two-dimensional images corresponding to a different respective location on the substrate surface within the predefined length and width;

associating each one of said produced two or more two-dimensional images with a respective known location on the substrate surface;

storing each one of said produced and associated two-dimensional images within the controller of the automated guided vehicle;

positioning the automated guided vehicle in a first known location within the predefined length and width relative to the substrate surface;

scanning the substrate surface at the first known location with the sensing device to produce a first additional two-dimensional image;

associating said produced first additional two-dimensional image with the first known location on the substrate surface;

moving the automated guided vehicle along a predetermined path relative to the substrate surface and at a predetermined speed from the first known location to a second known location;

scanning the substrate surface at predetermined time intervals with the sensing device during said step of moving the automated guided vehicle to produce a series of one or more additional two-dimensional images, with each one of said produced two or more additional two-dimensional images corresponding to an respective additional known location between the first and second known location;

associating each of said series of one or more produced additional two-dimensional images with the respective additional known location on the substrate surface;

scanning the substrate surface at the first known location with the sensing device to produce a second additional two-dimensional image;

associating said produced second additional two-dimensional image with the second known location on the substrate surface;

storing said produced and associated first additional two-dimensional image, said produced and associated second additional two-dimensional image, and each of said produced and associated two or more additional two-dimensional images within the controller of the automated guided vehicle;

positioning the automated guided vehicle in an unknown location within the predefined length and width relative to the substrate surface;

scanning the substrate surface corresponding to the unknown location with the sensing device to produce an supplemental two-dimensional image;

comparing said produced supplemental two-dimensional image to each of said stored two or more two-dimensional images, said produced and associated first additional two-dimensional image, said produced and associated second additional two-dimensional image, and each of said produced and associated two or more additional two-dimensional images to determine the location of the positioned automated guided vehicle relative to the substrate corresponding to the unknown location;

determining a path of movement for the automated guided vehicle from said determined location to a position along the predetermined path; and moving the automated guided vehicle along said determined path of movement from said determined location to the position along the predetermined path.

The present disclosure thus provides a method for increasing the accuracy of positioning and movement of the AGV in a particular facility. In particular, the methods described herein are designed to factor in dynamic changes within the facility, and in particular along the desired path of movement, such as a pickup and delivery route, that can affect the ability of the AGV to accurately determine its location and thus control its movement along the desired path of movement.

BRIEF DESCRIPTION OF THE DRAWINGS

FIG. 1 is perspective view of an automated guided vehicle in accordance with the present disclosure positioned on a substrate surface.

FIG. 2 is a schematic illustration of the electrical connection of the drive system, the steering system, a light source, and a sensing device each coupled to a controller.

DETAILED DESCRIPTION

Figure 3:
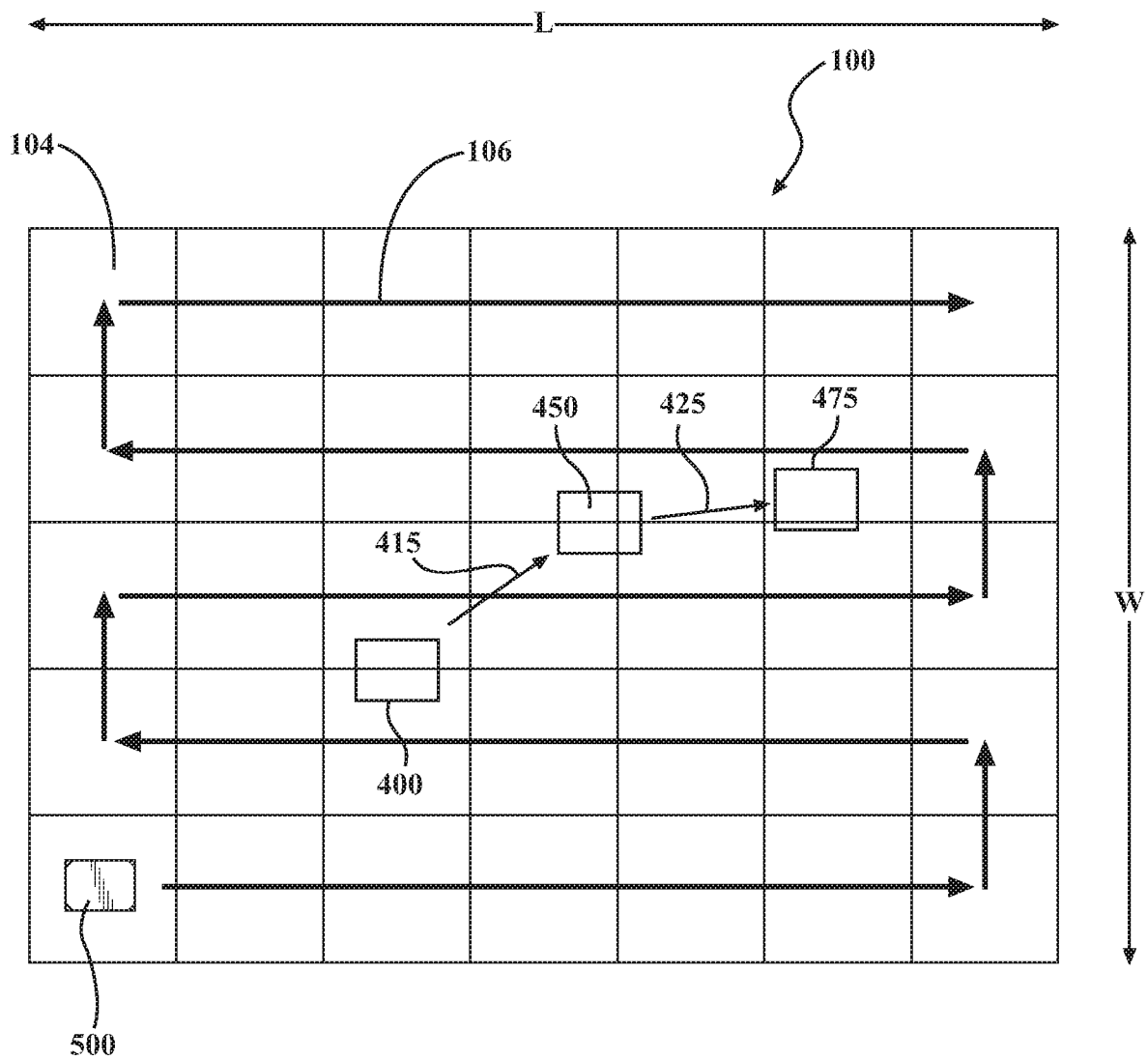
FIG. 3 is an overhead view of the substrate surface of FIG. 1 subdivided into a plurality of two-dimensional grid each having the same predefined width and predefined length.

The present disclosure is directed to methods for determining the location of an automated guided vehicle (AGV 20) relative to a substrate surface of a substrate, and is also directed to the associated methods for controlling the movement of the AGV relative to the substrate surface of the substrate.

The AGV 20 for use in the present disclosure can take on many forms, including but not limited to being in the form of a towing vehicle AGV, a unit load AGV, a pallet truck AGV, a fork truck AGV, hybrid truck AGV, a light load AGV, or an assembly line AGV. The AGV 20 can be used in a wide variety of manufacturing settings to transport materials (such as pallets, rolls, racks, carts, containers, and the like) relative to the substrate surface.

Regardless of the form, as illustrated in one exemplary embodiment in FIG. 1, the AGV 20 generally includes a base structure 22 for supporting the AGV 20, and also includes an additional structure (not shown) extending from and otherwise coupled to the base structure 22 that is designed to hold, store, pull or otherwise secure cargo or materials for transport. Still further, the AGV 20 includes a controller 35 that is configured generally to control the operation of the AGV 20 and components of the AGV 20, with certain description of such operation and control described with respect to certain components below.

As provided below, the AGV 20 described in the embodiments is of the type that is configured to be placed upon, and driven along, a substrate surface 102 of a substrate 100 (see FIGS. 1 and 3). However, in alternative embodiments, the AGV may be of the type that is positioned relative to the substrate surface 102, such as above and spaced from the substrate surface 102, and wherein the AGV 20 is propelled in a spaced relationship to the substrate surface 102 during normal operation. For ease of description hereinafter, the AGV 20 described in the embodiments is of the type that is placed upon, and driven along, a substrate surface 102, although the same principles of the present disclosure are relevant for other types of AGVs 20, such as those described above, that are propelled in a spaced relationship to the substrate surface 102.

The AGV 20 of the embodiment of FIG. 1 also includes a drive system 26 that is coupled to the base structure 22 and to the controller 35 (shown in FIG. 2) that includes one of the one or more drive wheels 29 (shown as a single drive wheel 29 in FIG. 1), with the drive wheel(s) 29 configured to rotate upon command from the drive system 26, via the controller 35, and propel the AGV 20 in a desired direction along a substrate surface 102 of a substrate 100. The substrate 100 has a predefined length L and width W (See FIG. 3) on which the AGV 20 is driven during normal usage.

Depending upon the ultimate use of the AGV 20, and corresponding to the form of AGV 20 as described above, the drive system 26 controlled by the controller 35 may be configured to rotate the drive wheel(s) 29 and propel the AGV 20 at low speeds or at higher speeds along the substrate surface 102.

In certain embodiments, the AGV 20 may also include one or more non-driven wheels 28. In the embodiment shown, the non-driven wheels 28 comprise four support wheels each arranged in corners of the base structure 22. The non-driven wheels 28 shown in FIG. 1 are caster wheels able to rotate and swivel about swivel axes to assume a trailing orientation relative to a desired direction of movement of the AGV 20 along the substrate surface 102. Each of the non-driven wheels 28 can be a part of a caster assembly, which each caster assembly mounted to the base structure 22. It should be understood that various configurations of the caster assemblies 60 are contemplated.

Still further, the AGV 20 also includes a steering system 40 that is coupled to the drive system 26 and the controller 35 (shown in FIG. 2) that is configured to steer the AGV 20 along the substrate surface 102. The steering system 40 can take on many forms, with the differential speed control being the most common as illustrated in FIG. 1, in which the drive system 26 includes two independent fixed drive wheels 28 that can be driven at different speeds according to commands received by the steering system 40 and drive system 26 from the controller 35 in order to turn or driven at the same speed to allow the AGV 20 to go forwards or backwards. The steering system 40 may also include one or more swivelable drive wheels 29 that are respectively swivelable about an axis (not shown), thereby allowing the AGV 20 to rotate the swivelable drive wheels 29 such that the AGV 20 may be propelled in a diagonal or lateral direction. In further embodiments, the AGV 20 may include both fixed drive wheels 28 and swivelable drive wheels 29.

In certain embodiments, the base structure 22 of the AGV 20 also includes a sensing device 50 coupled to the controller 35 (shown in FIG. 2) that is configured to scan the substrate surface 102, upon command from the controller 35, in a predetermined field of view, corresponding to a grid (illustrated by reference numeral 104 in FIG. 3) relative to the substrate 100 in proximity to the AGV 20, defined by a length and width of the substrate 100 in an x- and y-direction corresponding to the x- and y-coordinates on a Cartesian coordinate system, and generate information, typically in the form of a two-dimensional image, regarding the two-dimensional surface characteristics of the substrate surface 102 within the respective grid 104.

In certain embodiments, the sensing device 50 is a camera 52, and the generated information is in the form of captured light that is processed by the camera 52 into two-dimensional images that are stored on the controller 35.

The camera 52 utilized on the AGV 20 is dependent upon the desired image resolution of the two-dimensional images produced alone or in combination with the speed in which the AGV 20 is propelled along the substrate surface 102 during normal operation of the AGV 20 in its intended use.

For AGVs 20 used in lower speed applications, area scan camera systems (i.e., cameras that capture images instantly with a desired grid 104) may be utilized. One exemplary, non-limiting, area scan camera systems that can be utilized is the Basler Ace area scan camera, commercially available in many models from Basler, Inc. of Exton, Pennsylvania.

For AGVs 20 used in higher speed applications, cameras having higher shutter speeds are contemplated. Examples of cameras for these higher speed applications include line scan camera systems (i.e., cameras take capture images with one line per shot). Line scan camera systems can capture images at a very high rate, but at a lower resolution, than the cameras described above with respect to lower speed applications. One exemplary, non-limiting line scan camera system that can be utilized is the Basler Racer line scan camera, commercially available in many models from Basler, Inc. of Exton, Pennsylvania.

Of course, while area scan camera systems and line scan camera systems are specifically contemplated for use as the camera 52, other types of digital cameras, visible light cameras, infrared cameras and the like that can produce two-dimensional images of a desired resolution in combination with the speed in which the AGV 20 is propelled along the substrate surface 102 during normal operation are specifically contemplated.

The base structure 22 of the AGV 20 can also include one or more light sources 55 (shown as two light sources 55 in FIG. 1) that are also optionally coupled to the controller 35 (such as shown in FIG. 2). These light sources 55 provide additional light reflected from the substrate surface 102 that may be received by the sensing device 50 and used by the sensing device to generate or produce each one of the respective two-dimensional images.

While the base structure 22, drive system 26, non-driven wheels 28, drive wheel 29, controller 35, steering system 40, sensing device 50, and light source 55 of the AGV 20 are shown in respective locations in FIG. 1, such locations are merely representative of one possible configuration on the AGV 20. By way of example, the sensing device 50 may be located beneath the base structure 22, or along one of the other sides of the base structure 22, and is not limited to the illustration in FIG. 1. Still further, the number of sensing devices 50 is not limited to a single sensing device as illustrated in FIG. 1.

The controller 35 includes memory 37. Memory 37 may be any memory suitable for storage of data and computer-readable instructions. For example, the memory 37 may be a local memory, an external memory, or a cloud-based memory embodied as random access memory (RAM), non-volatile RAM (NVRAM), flash memory, or any other suitable form of memory. The controller 35 comprises one or more microprocessors for processing instructions or for processing an algorithm stored in memory to control operation of the powered drive system 26, the steering system 40, the sensing device 50, and/or the light source 55. Additionally or alternatively, the controller 35 may comprise one or more microcontrollers, field programmable gate arrays, systems on a chip, discrete circuitry, and/or other suitable hardware, software, or firmware that is capable of carrying out the functions described herein. The controller 35 may be carried on-board the AGV 20, or may be remotely located. In one embodiment, the controller 35 is mounted to the base structure 22. The controller 35 may comprise one or more subcontrollers configured to control the powered drive system 26, the steering system 40, the sensing device 50, and/or the light source 55 (see FIG. 2). Power to the powered drive system 26, the steering system 40, the sensing device 50, and the light source 55 and/or the controller 35 may be provided by a battery power supply. The controller 35 may communicate with the powered drive system 26, the steering system 40, the sensing device 50, and the light source 55 via wired or wireless connections. The controller 35 generates and transmits output signals (commands) to the powered drive system 26, the steering system 40, the sensing device 50, and the light source 55 to perform one or more desired functions.

In one embodiment, the controller 35 comprises an internal clock to keep track of time. In one embodiment, the internal clock is a microcontroller clock. The microcontroller clock may comprise a crystal resonator; a ceramic resonator; a resistor, capacitor (RC) oscillator; or a silicon oscillator. Examples of other internal clocks other than those disclosed herein are fully contemplated. The internal clock may be implemented in hardware, software, or both. In some embodiments, the memory 37, microprocessors, and microcontroller clock cooperate to send signals to the powered drive system 26, the steering system 40, the sensing device 50, and/or the light source 55 to meet predetermined timing parameters.

The present disclosure describes a method for accurately determining a positioning of an AGV relative to, or on, a substrate surface 102 of a substrate 100 at any given time. The substrate 100, as best shown in FIG. 3, has predefined width W and predefined length L. The predefined width W and length L of the substrate 100 varies from a small amount (such as a few meters) to a large amount (such as many meters) depending upon a wide variety of factors, such as but not limited to the space requirements within a building or factory and the size and/or types of materials to be transported (such as pallets, rolls, racks, carts, containers, and the like) by the AGV 20, which also impacts the size of the AGV 20 utilized.

The predefined width W and length L of the substrate 100 can be further subdivided into two or more grids 104 (see FIG. 3, which illustrates the substrate 100 subdivided into thirty five grids), with each grid 104 also having a predefined width and a predefined length, with one or more of the grids 104 capable of describing a precise location relative to the substrate 100 in x- and y-coordinates as defined in a Cartesian coordinate system. The grids 104 can be used by the controller 35 of the AGV 20 to identify the precise position of the AGV 20 relative to the substrate 100 at any given time, and can also aid in precisely moving the AGV 20 to another location relative to the substrate 100 (corresponding to another grid 104), such as along a desired path of travel, as described by the methods below. Each respective grid 104, in certain embodiments, may also be representative of a predetermined field of view as sensed by the sensing device 50 and corresponding to a single generated or produced two-dimensional image, as described below.

Figure 4:
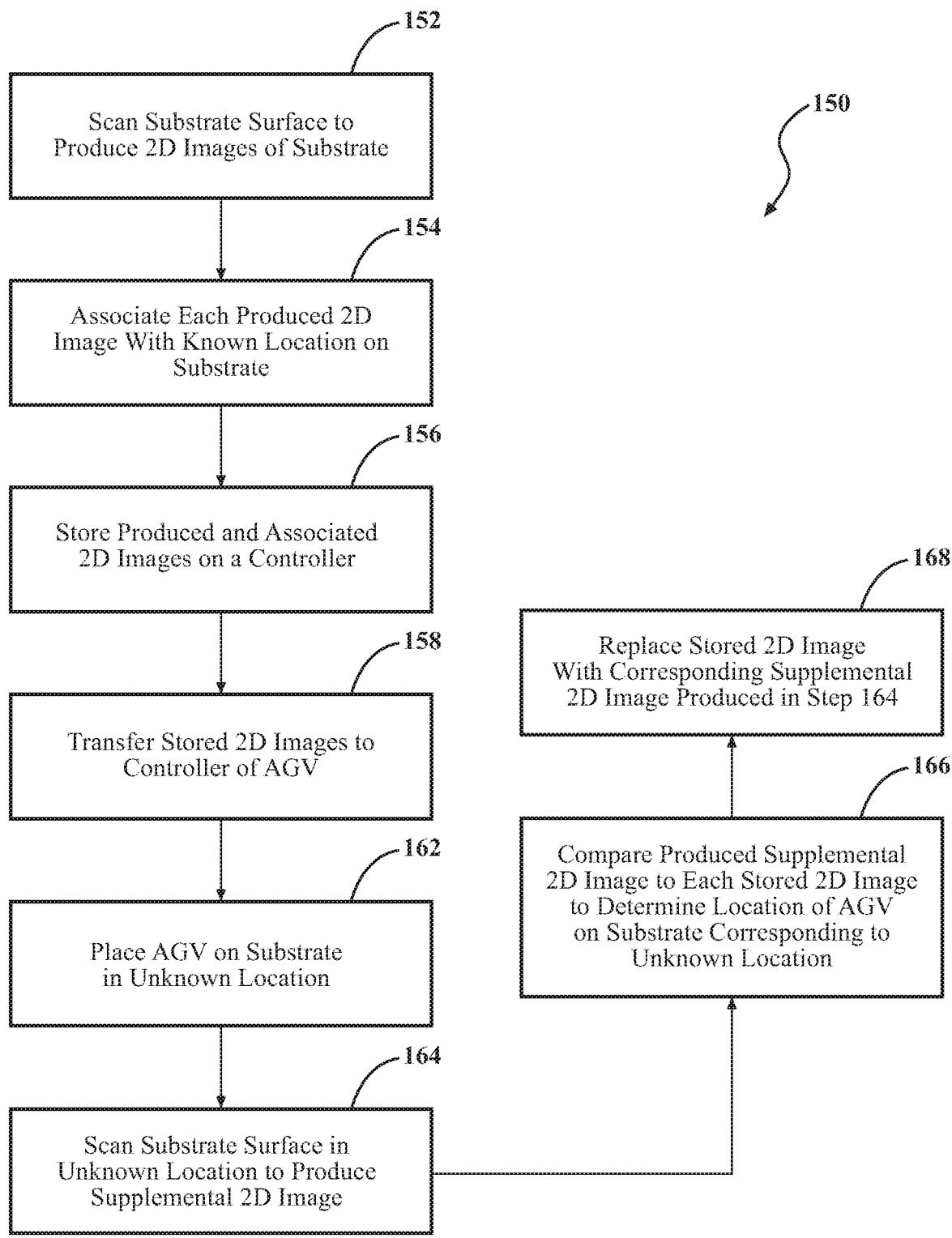
FIG. 4 is a logic flow diagram illustrating an exemplary method of the present disclosure for determining a positioning of the automated guided vehicle of FIG. 1 on the two-dimensional grid of FIG. 3.

Referring now to FIG. 4, a logic flow diagram of an exemplary method for determining a location of the AGV 20 relative to the substrate 100, and an associated method for controlling the movement of the AGV 20 relative to the substrate, is provided. For ease of description, FIG. 3 is also provided which aids in the description of the various steps of the logic flow diagram of FIG. 4.

The exemplary method (shown as 150 in FIG. 4) begins with Step 152, in which the substrate 100 having a predefined length L and width W is prescanned to produce two or more two-dimensional images, with each respective one of the produced two or more two-dimensional images corresponding to a different respective location on the substrate surface 102 within the predefined length and width.

Figure 5:
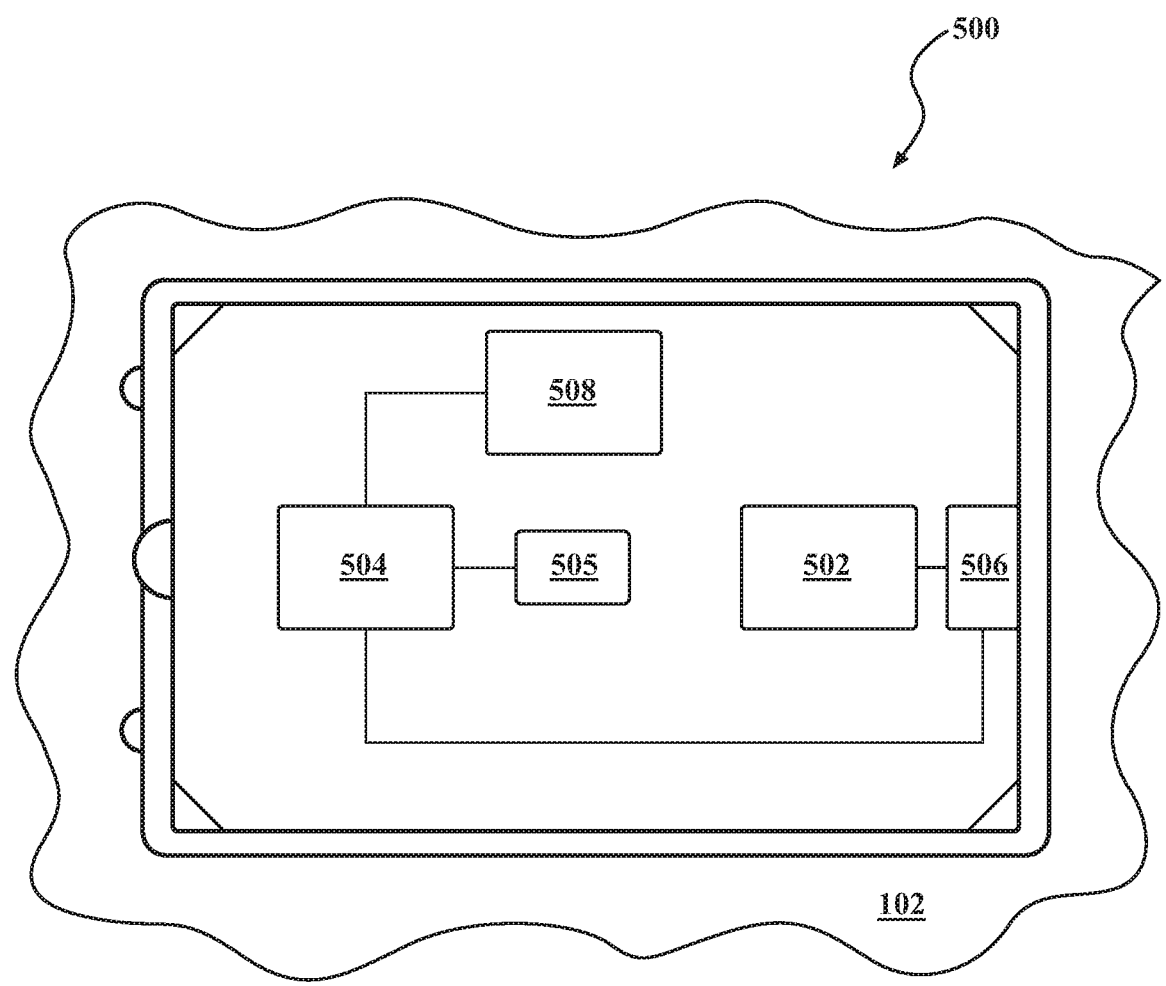
FIG. 5 is a perspective view of a scanning device for use in scanning a substrate in accordance with the exemplary methods.

In certain embodiments, a scanning device 500 (see FIG. 5) having a sensing device 502 coupled to a controller 504 is positioned relative to, or on, the substrate surface 102, such as in a position corresponding to a first one of the respective two or more dimensional grids 104 (shown as the bottom left grid 104 in FIG. 3). The controller 504 then commands the sensing device 502 to produce a two-dimensional image by scanning the substrate surface 102 in proximity to the scanning device 500. Such proximity may be beneath the scanning device 500, in front of the scanning device 500, behind the scanning device, on one or both of the sides of the scanning device 500, or any combination thereof. The controller 504 also includes memory 505 (see the description above with respect to memory 37).

During Step 152, the scanning device 500 moves relative to the entirety of the predefined length and width of the substrate 100, illustrated by arrow 106 in FIG. 3, corresponding to different respective locations on the substrate 100 represented by each of the additional grids 104 in FIG. 3. During this movement, the controller 504 commands the sensing device 502 to produce a series of two or more two-dimensional images corresponding to each different respective location on the substrate surface 102, which is represented by each of the additional grids 104 in FIG. 3.

In certain embodiments, the sensing device 502 is a camera, with light received from the substrate surface 102 being captured by the camera during the prescanning step and processed to produce the two-dimensional image. Further, for each produced two-dimensional image, the controller 504 may also command a light source (light source 506 is illustrated in the scanning device 500 of FIG. 5) to illuminate onto the substrate surface 102, and thus the produced two-dimensional image may be influenced by reflected light off the substrate surface 102 produced by the light source.

The produced two-dimensional images captures two-dimensional surface feature characteristics (i.e., features) of the substrate surface 102 within a predetermined viewing window of the substrate surface 102, such as a predetermined length and width as represented by each one of the respective grids 104. Such two-dimensional features of the substrate surface 102 corresponding may include ridges, bumps, waves and voids that may, or may not, be visible to the human eye but can be captured by the sensing device, presented on the produced two-dimensional image.

In certain embodiments, the scanning device 500 is the AGV 20, with the sensing device 502, controller 504, and light source 506 corresponding, respectively to the sensing device 50, the controller 35, and the camera 52 on the AGV 20.

While the description in Step 152 is suggestive that each respective two-dimensional image, represented by respective grid 104, includes separate features not found in any other of the series of produced two-dimensional images, this is not necessarily the case. In fact, a feature on the substrate surface 102 may be identified in multiple produced two-dimensional images as the scanning device 500 moves along the substrate 100. Stated another way, the present disclosure specifically contemplates wherein the sensing device 502 is configured to produce two-dimensional images having an overlap of the features in the series of adjacent produced two or more two-dimensional images. In certain embodiments, the overlap of the produced two-dimensional images in two adjacent produced two-dimensional images (represented in FIG. 3 by any two two-dimensional images defined by adjacent produced two-dimensional grids 104 each defined as having a predefined grid length and predefined grid with) may be anywhere from 99.9% to 0.1%, such that the features present in any one produced two-dimensional images may be present in two or more adjacent locations in any one direction along the substrate 100 (such as represented in multiple adjacent grids 104 in any direction in FIG. 3). The greater the degree of overlap, the better the accuracy for precisely determining the location of the identified feature on the produced two-dimensional images, as will be described in further detail below.

After the prescanning of Step 152 is completed, the method proceeds to Step 154, in which each one of the produced series of two or more two-dimensional images is associated with a respective known location within the predefined length and width of the substrate surface 102, such as within a respective grid 104 as illustrated in FIG. 3. In particular, each produced two-dimensional image is associated with a predefined location of the substrate 102, represented in respective x- and y-coordinates as defined in the Cartesian coordinate system.

In certain embodiments, a location association device 508 is utilized to associate each respective one produced two-dimensional image with a corresponding location on the substrate surface. In certain embodiments, such as provided in FIG. 5, the location association device 508 is contained on the scanning device 500 and is coupled to the controller 504. Alternatively, the location association device 508 may be a separate device. Suitable location association devices 508 that may be utilized include, but are not limited to, laser tracking devices, global positioning satellite (GPS) devices (such as handheld, indoor or outdoor GPS devices), total station devices (TS), total station theodolite (TST) devices, or the like. Still further, non-electronic location association devices, such as tape measures or taping the surface 102 of the substrate 100, may also be utilized.

In particular, the location association device 508 is coordinated with the scanning device 500 to identify the location of the scanning device 500 on the substrate 100 at a particular time and representing the results in respective x- and y-coordinates as defined in the Cartesian coordinate system. These results are sent to the controller 504, which is configured to identify the respective one two-dimensional image captured and produced by the sensing device 502 at the same time and assign the determined x- and y-coordinates from the location association device 508 with the respective one produced two-dimensional image from the scanning device 502 as a produced and associated two-dimensional image. The process is repeated for each additional one of the produced one or more two-dimensional images, therein providing a series of produced and associated two-dimensional images associated with each scanned location on the predefined length L and width W of the substrate 100.

Next, in Step 156, the series of produced and associated two-dimensional images are stored in the memory of the controller. In particular, when the scanning device 500 is utilized, the produced and associated two-dimensional images are stored in the memory 505 of the controller 504. When the AGV 20 itself is utilized, the produced and associated two-dimensional images are stored in memory 37 of the controller 35.

In Step 160, wherein the scanning device 500 is not the AGV 20, the stored two-dimensional images are transferred to the memory 37 of the controller 35 of the AGV 20. When the AGV 20 itself is the scanning device 500, Step 158 is not required.

Next, in Step 162, the AGV 20 is positioned relative to the substrate 100 at an unknown location (shown for illustrative purposes wherein the AGV 20 is positioned at the location corresponding to reference number 400 in FIG. 3).

In Step 164, the controller 35 commands the sensing device 50 to scan the substrate surface 102 at the unknown location 400 in the manner described above in Step 152 and produced a supplemental two-dimensional image.

In Step 166, the produced supplemental two-dimensional image is compared to each of the stored produced and associated two-dimensional images. More specifically, the controller 35 receives an output signal from the sensing device 50 corresponding to the produced supplemental two-dimensional image. The controller 35 accesses its memory 37 and compares the features of the supplemental two-dimensional image with the features of each one of the stored produced and associated two-dimensional images.

The controller 35 then determines which one of the stored and associated two-dimensional images most closely matches the produced supplemental two-dimensional image.

In certain embodiments, the controller 35 determines which one of the stored and associated two-dimensional images most closely matches the produced supplemental two-dimensional image using a template matching-based approach (i.e., a template matching based object recognition approach). Template matching is a technique in which the produced supplemental two-dimensional image is processed by an algorithm contained in the memory 37 of the controller 35 to find small parts of the two-dimensional image which most closely match small parts of a template image of one of the previously stored produced and associated two-dimensional images (with the templates including the small parts of each of the previously stored produced and associated two-dimensional images producing template images by the same technique).

Because the determined stored and associated two-dimensional image has been previously precisely located relative to the substrate 100 by x and y-direction Cartesian coordinates (within a margin of accuracy of about 10 millimeters) using the location association device 508 by the method as described above in Step 154, the location 400 of the AGV 20 corresponding to the produced supplemental two-dimensional image is thereby precisely determined as corresponding to the respective determined stored and associated two-dimensional image. Moreover, the ability of the controller 35 to more precisely identify the location 400 is enhanced as the amount of overlap of the series of produced and associated two-dimensional images increases from towards 99.9% overlap.

The method of the present disclosure further proceeds with Step 168, in which the supplemental two-dimensional image, replaces the determined and produced two-dimensional image from Steps 152 and 154, with the supplemental two-dimensional image being associated with the particular location 400 by the controller 35. In this way, the surface feature characteristics of the substrate surface 102 at the identified location 400 are updated. As such, changing dynamic conditions of the substrate surface 102 corresponding to the identified location, such as by wear on the substrate surface 102 (such as by cleaning or by the frictional engagement of the AGV 20 or other object) or by enhancements to the substrate surface 102 (such as wherein the substrate surface 102 may be cleaned of debris or the like) corresponding to the identified location 400, can be continually updated on the controller 35 in determining the location of the AGV 20 in any subsequent operation of the AGV 20.

While not described in the logic flow diagram of FIG. 4, the present disclosure also allows the controller 35 to continuously monitor the location of the AGV 20 relative to the substrate 100. Accordingly, if the AGV 20 is moving, the controller 35 can utilize the method of the present disclosure to confirm the direction of movement and correct the direction of movement to a desired direction of movement in a quick and efficient manner. Further, the method also allows the controller 35 to stop the moving AGV 20 at any location along the substrate 100.

Related to this additional advantage, the present disclosure also provides an associated method for precisely controlling the movement of the AGV 20 relative to the substrate 100. As described below, in one embodiment of the method, as illustrated in the logic flow diagram of FIG. 6, the movement of the AGV 20 from an unknown location to return to a predetermined path of movement is described.

A predetermined path of movement, as used in the method herein and further illustrated in FIG. 3 by arrow 425, refers to a predetermined route of movement between a first known location 450 (i.e., a starting location) and a second known location 475 (i.e., an ending location 475) that the AGV 20 utilizes in its normal operation to transport goods or perform another function.

In particular, the method describes wherein the AGV 20 is located in an unknown location 400 on the substrate 100, and how the AGV is controlled to return to the predetermined path 425 at either the first known location 450 or second known location 475 along a determined path 415, or any location between the first and second known location 450, 475 on the predetermined path 425.

Figure 6:
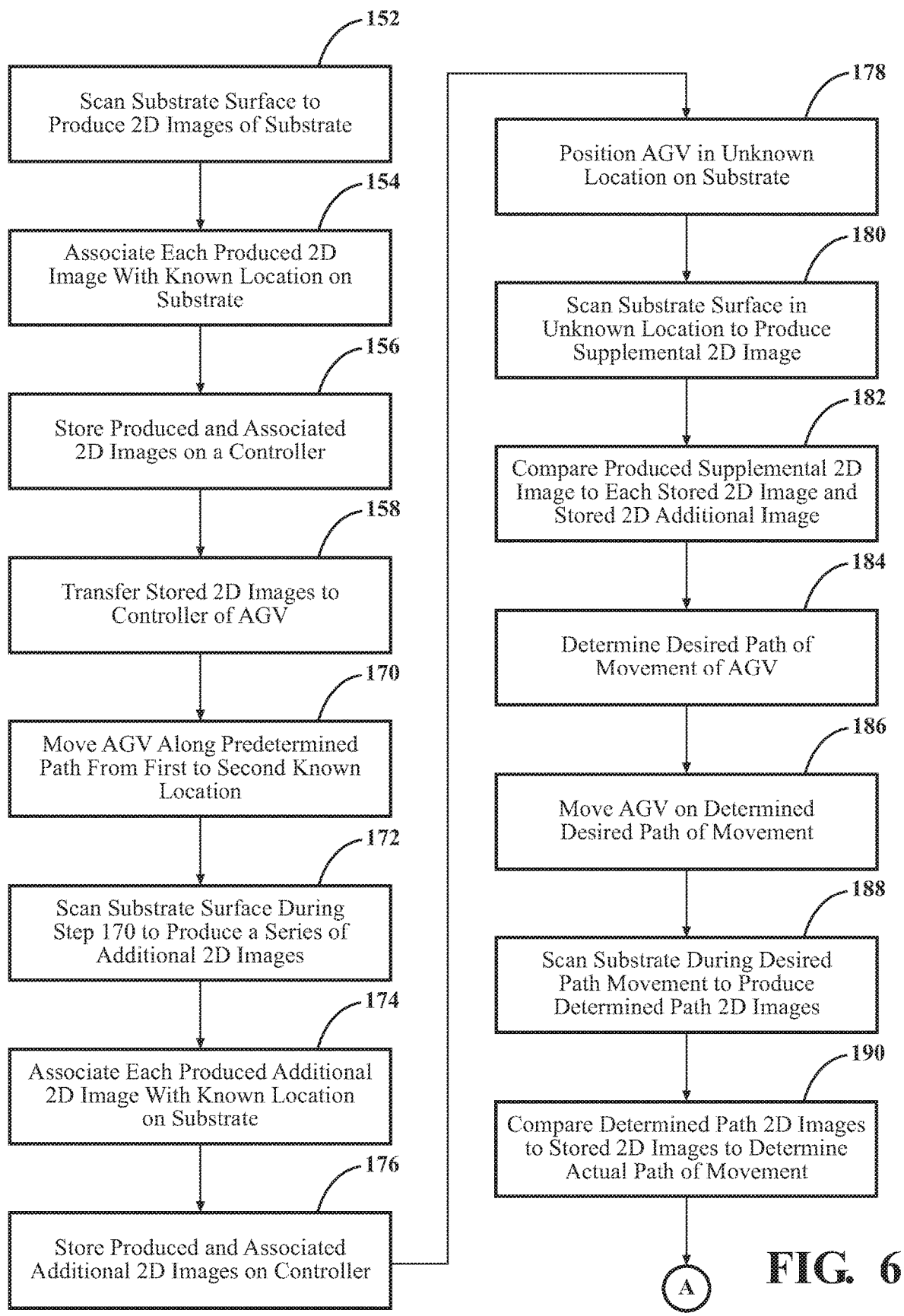
FIG. 6 is a logic flow diagram illustrating an exemplary method of the present disclosure for controlling the movement of the automated guided vehicle of FIG. 1 from a first unknown position to a first known position on a predetermined path on the two-dimensional grid of FIG. 3.
Figure 6:
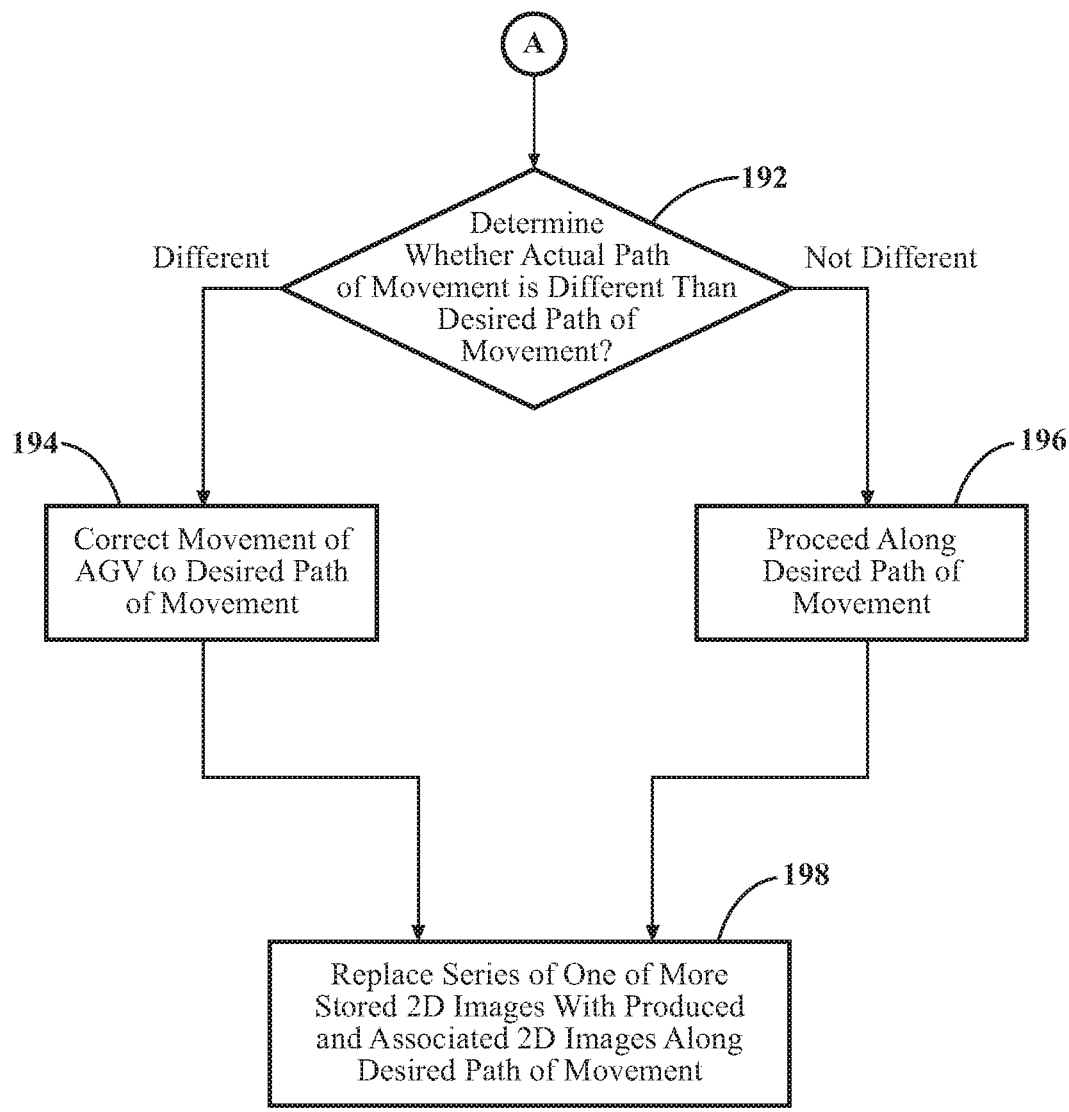

Referring now to FIG. 6, and similar to the method described in FIG. 4, the method begins with Steps 152, 154, 156 and optionally Step 158 wherein the substrate 100 was prescanned to produce a series of two or more two-dimensional images, with the produced two or more two-dimensional images being associated with a respective known location, and with the produced and associated two-dimensional images being stored on the controller of the AGV, or otherwise being stored on the controller of the scanning device and transferred and stored to the controller 35 of the AGV 20.

Next, in Step 170, the AGV 20 may be placed onto the substrate surface 102 at the first known location 450, wherein the substrate surface 102 is scanned with the sensing device 50 to produce a first additional two-dimensional image.

Next, in Step 172, the AGV 20 is moved along the predetermined path 425 relative to the substrate surface 102 and at a predetermined speed from the first known location 450 to the second known location 475 and stops, wherein the substrate surface 102 is scanned with the sensing device 50 to produce a second additional two-dimensional image. During the course of this movement, the substrate surface 102 is scanned at predetermined time intervals with the sensing device 50 between the first known location 450 and the second known location 475 to produce a series of one or more additional two-dimensional images.

The method of scanning the substrate surface 102 in Steps 170 and 172 is generally in accordance with the method of prescanning the substrate surface described above in Step 152.

Next, in Step 174, each of the produced additional two-dimensional images (i.e., the produced first and additional two-dimensional images and the produced series of one or more additional two-dimensional images) are associated with a known location of the substrate surface corresponding to the predetermined path in the same manner as the produced two-dimensional images were associated in Step 154.

In particular, the produced first additional two-dimensional image is associated with the first known location 450 on the substrate surface 102, the produced second additional two-dimensional image is associated with the second known location 475 on the substrate surface 102, and each of the series of one or more additional two-dimensional images is associated with a respective additional known location along the predetermined path 425 between the first and second known location 450, 475.

Next, in Step 176, each of the produced and associated additional two-dimensional images from Step 174 are stored onto the controller 35 in a manner as described in Step 156 above. In certain embodiments, associated with Step 176, each of the produced and associated additional two-dimensional images from Step 174 replace the corresponding series of one or more stored produced and associated two-dimensional images corresponding to the known locations produced in Step 154 above.

Next, in Step 178 and similar to Step 162, the AGV 20 is positioned relative to the substrate 100 at an unknown location (shown for illustrative purposes wherein the AGV 20 is positioned at the location corresponding to reference number 400 in FIG. 3).

In Step 180 and similar to Step 164 of FIG. 4, the controller 35 commands the sensing device 50 to scan the substrate surface 102 at the unknown location 400 in the manner described above in Step 152 and produce a supplemental two-dimensional image.

In Step 182 and similar to Step 166 of FIG. 4, the produced supplemental two-dimensional image is compared to each of the stored produced and associated two-dimensional images from Step 152 and to each of the stored and associated additional two-dimensional images from Step 176. More specifically, the controller 35 receives an output signal from the sensing device 50 corresponding to the produced supplemental two-dimensional image. The controller 35 accesses its memory 37 and compares the features of the supplemental two-dimensional image with the features of each one of the stored produced and associated two-dimensional images and stored produced and associated additional two-dimensional images.

Next, in Step 184, based upon the determined location of the AGV 20 as provided in Step 182, and based upon the controller 35 already knowing the location of the first known location 450 or the second known location 475 or any location along the predetermined path 425, the controller 35 determines a desired path of movement (shown by arrow 415 in FIG. 4) relative to the substrate 100 by which the AGV 20 is to move from the determined location 400 toward the respective one of the first known location 450 or the second known location 475 or any location along the predetermined path 425 (shown in FIG. 3 as a desired path of movement 415 towards the first known location 425).

In Step 186, the controller 35 directs the movement of the AGV 20 along the desired path 415 determined in Step 184 relative to the substrate 100. More specifically, in certain embodiments, the controller 35 commands the steering system 40 and the drive system 26 to power the drive wheels 28 to rotate and propel the AGV 20 on the desired path 415 at a desired speed.

In Step 188, as the AGV 20 moves along the desired path 415 relative to the substrate 100, the controller 35 further commands the sensing device 50 to continuously scan the substrate surface 102 at predetermined time intervals and produce one or more determined path two-dimensional images.

In Step 190, the one or more produced determined path two-dimensional images are compared to each of the stored produced and associated two-dimensional images from Step 156 and to each of the stored and associated additional two-dimensional images from Step 176 to determine whether an actual path of movement of the AGV 20 to determine a relative location of the AGV 20 relative to the substrate surface 102 during each one of respective one of the predetermined time intervals. From this information, the controller 35 can determine the actual path of movement of the AGV 20.

In Step 192, the method continues wherein the determined actual path of movement is compared to the desired path of movement 415. More specifically, the controller 35 utilizes an algorithm stored in the memory 37 to compare the determined actual path of movement is compared to the desired path of movement 415 to determine whether the determined actual path of movement is different than said desired path of movement 415.

If the determined actual path of movement is different than said desired path of movement 415, the logic proceeds to Step 194, wherein the determined actual path of movement is corrected to the desired path of movement 415. In certain embodiments, the corrections are accomplished wherein the controller 35 directs the drive system 26 or the steering system 40 to change the direction of movement of the AGV 20 relative to the substrate surface 102.

If the determined actual path of movement is different than said desired path of movement 415, the logic proceeds to Step 196, wherein the AGV 20 proceeds along the desired path of movement 415.

Next, in Step 198, the method may further include the step of associating the one or more produced determined path two-dimensional images to a known location in a manner similar to that described above in Steps 154 or 174 and storing one or more produced determined path two-dimensional images similar to the manner described above in Steps 156 and 176.

In certain embodiments, associated with Step 198, each of the produced and associated determined path two-dimensional images from Step 188 replace the corresponding series of one or more stored produced and associated two-dimensional images corresponding to the known locations along the desired path of movement 415 or actual path of movement described in Steps 188 and 190 above.

While the present disclosure is ideally suited for use in a manufacturing facility or warehouse, the method of the present disclosure can be used both in outdoors and indoor settings. Further, because the method of the present disclosure can continually update the two-dimensional images corresponding to one or more of the grids 104, the present disclosure can continually monitor and precisely locate the AGV 20 under every changing substrate surface 102 conditions, and is highly tolerant to dirt or other contaminants that change the two-dimensional surface characteristics on the substrate 100. Accordingly, the present disclosure is ideally suited for use as a safety or guidance method for autonomous vehicles in order to determine exact vehicle location on a prescanned road to submillimeter accuracy.

Still further, as noted above, while the AGV 20 in accordance with the description above generally relates to an AGV 20 that is in contact with the substrate surface 102 during normal usage, the present disclosure also contemplates wherein the AGV 20 is not in contact with the substrate surface 102, but is remotely located from the substrate surface 102 during use. By way of example, the AGV 20 may be flying above the substrate surface 102, or hovering above the substrate surface 102, during normal usage. However, the methodology for determining the location of the AGV relative to the substrate surface 102, as described above, still applies.

It is to be appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The invention claimed is:

1. A method for accurately determining a location of an automated guided vehicle positioned relative to a substrate, the method comprising:

positioning a scanning device having a sensing device on a substrate surface of the substrate;

prescanning the substrate surface with the sensing device while moving the scanning device along the substrate surface between two or more locations within a predefined length and width to produce a series of two or more two-dimensional images, with each one of the series of two or more two-dimensional images corresponding to a respective one of the two or more locations on the substrate surface within the predefined length and width;

associating each respective one of the series of two or more two-dimensional images with a corresponding respective location on the substrate surface within the predefined length and width;

storing each respective one of the series of two or more two-dimensional images associated with the corresponding respective location on the scanning device;

positioning the automated guided vehicle in an unknown location within the predefined length and width relative to the substrate surface;

scanning the substrate surface corresponding to the unknown location to produce a supplemental two-dimensional image; and comparing the supplemental two-dimensional image to each respective one of the series of two or more two-dimensional images to determine the location of the positioned automated guided vehicle relative to the substrate, wherein each different respective location corresponding to the respective one of the series of two-dimensional images defines a two-dimensional grid of a predefined grid length and predefined grid width within the substrate surface.

2. The method of claim 1, wherein comparing the supplemental two-dimensional image to each respective one of the series of two or more two-dimensional images comprises:

identifying a respective one of the series of two or more two-dimensional images that corresponds to the supplemental two-dimensional image using a template matching-based approach.

3. The method of claim 2 further comprising replacing the respective identified one of the series of two or more two-dimensional images with the supplemental two-dimensional image corresponding to the determined location.

4. The method of claim 1, wherein the automated guided vehicle further includes the sensing device coupled to a controller, with the controller storing each respective one of the series of two or more two-dimensional images, and wherein scanning the substrate surface corresponding to the unknown location and comparing the supplemental two-dimensional image to each respective one of the series of two or more two-dimensional images comprise:

positioning the automated guide vehicle in an unknown location relative to the substrate surface;

scanning the substrate surface corresponding to the unknown location with the sensing device to produce a supplemental two-dimensional image;

using the controller to compare the supplemental two-dimensional image to each respective one of the series of two or more two-dimensional images to determine the location of the positioned automated guided vehicle relative to the substrate in the unknown location.

5. The method of claim 4, wherein using the controller to compare said supplemental two-dimensional image to each respective one of the series of two or more two-dimensional images comprises:

using the controller to identify a respective one of the series of two or more two-dimensional images that corresponds to the supplemental two-dimensional image using a template matching-based approach.

6. The method of claim 5 further comprising:

using the controller to associate the determined location with the supplemental two-dimensional image; and replacing the respective one of the series of two or more two-dimensional images with the supplemental two-dimensional image on the controller corresponding to the determined location.

7. The method of claim 1, wherein the automated guided vehicle has an automated guide vehicle sensing device coupled to a controller, and wherein scanning the substrate surface corresponding to the unknown location and comparing the supplemental two-dimensional image to each of the series of two or more two-dimensional images comprise:
transferring each respective one of the series of two or more two-dimensional images from the scanning device to the controller of the automated guide vehicle;
positioning the automated guide vehicle in an unknown location within the predefined length and width relative to the substrate surface;
scanning the substrate surface corresponding to the unknown location with the automated guide vehicle sensing device to produce a supplemental two-dimensional image;
using the controller to identify a respective one of the series of two or more two-dimensional images that corresponds to the supplemental two-dimensional image using a template matching-based approach.

8. The method of claim 1, wherein the automated guided vehicle has a light sensing device coupled to the controller, and wherein scanning the substrate surface corresponding to the unknown location and comparing the supplemental two-dimensional image to each of the series of two or more two-dimensional images comprise:
transferring each respective one of the series of two-dimensional images from the scanning device to the controller of the automated guide vehicle;
positioning the automated guide vehicle in an unknown location within the predefined length and width relative to the substrate surface;
capturing light from the substrate surface with the light sensing device from the unknown location;
processing the captured light with said controller to produce a supplemental two-dimensional image;
using the controller to identify a respective one of the series of two or more two-dimensional images that corresponds to the supplemental two-dimensional image using a template matching-based approach.

9. The method of claim 8, wherein the automated guided vehicle also has a light source, and wherein scanning the substrate surface corresponding to the unknown location further comprises:
supplying light from the light source to the substrate surface corresponding to the unknown location.

10. The method of claim 1, wherein a degree of overlap between the two-dimensional images of an adjacent pair of the two-dimensional grids ranges from 0% overlap to 99.9% overlap.

11. A method for controlling a movement of an automated guided vehicle relative to a substrate, the automated guided vehicle including a sensing device coupled to a controller, said method comprising:
prescanning a predefined length and width of a substrate surface of the substrate to produce a series of two or more two-dimensional images, each respective one of said series of two or more two-dimensional images corresponding to a different respective location on the substrate surface within the predefined length and width;
associating each one of the series of two or more two-dimensional images with a respective known location on the substrate surface;
storing each one of the series of two-dimensional images within the controller of the automated guided vehicle;
positioning the automated guided vehicle in a first known location within the predefined length and width relative to the substrate surface;
scanning the substrate surface at the first known location with the sensing device to produce a first additional two-dimensional image;
associating the first additional two-dimensional image with the first known location on the substrate surface;
moving the automated guided vehicle along a predetermined path relative to the substrate surface and at a predetermined speed from the first known location to a second known location;
scanning the substrate surface at predetermined time intervals with the sensing device during said step of moving the automated guided vehicle to produce a series of one or more additional two-dimensional images, with each one of the series of one or more additional two-dimensional images corresponding to an respective additional known location between the first and second known location;
associating each of the series of one or more additional two-dimensional images with the respective additional known location on the substrate surface;
scanning the substrate surface at the second known location with the sensing device to produce a second additional two-dimensional image;
associating the second additional two-dimensional image with the second known location on the substrate surface;
storing the first additional two-dimensional image, the second additional two-dimensional image, and each of the one or more additional two-dimensional images within the controller of the automated guided vehicle;
positioning the automated guided vehicle in an unknown location within the predefined length and width relative to the substrate surface;
scanning the substrate surface corresponding to the unknown location with the sensing device to produce an supplemental two-dimensional image;
comparing the supplemental two-dimensional image to each of the series of two or more two-dimensional images, the first additional two-dimensional image, the second additional two-dimensional image, and each of the one or more additional two-dimensional images to determine a location of the positioned automated guided vehicle relative to the substrate corresponding to the unknown location;
determining a path of movement for the automated guided vehicle from the determined location corresponding to the unknown location to a position along the predetermined path;
moving the automated guided vehicle along the path of movement from the determined location corresponding to the unknown location to the position along the predetermined path;
scanning the substrate surface at predefined time intervals using the sensing device during said step of moving the automated guided vehicle along the path to produce one or more determined path two-dimensional images;
comparing the one or more determined path two-dimensional images to each of the series of two or more two-dimensional images, the two or more two-dimensional images, the first additional two-dimensional image, the second additional two-dimensional image, and each of the one or more additional two-dimensional images to determine a relative location of the automated guided vehicle relative to the substrate surface during a respective one of the predetermined time intervals;

determining an actual path of movement of the automated guided vehicle relative to the substrate surface by comparing each of the relative locations at the predefined time intervals;

comparing the actual path of movement to the path of movement; and correcting the actual path of movement to the path of movement when the actual path of movement is different than the path of movement.

12. The method of claim 11, wherein comparing comprises:

comparing the supplemental two-dimensional image to each of the series of two or more two-dimensional images, the first additional two-dimensional image, the second additional two-dimensional image, and each of the one or more additional two-dimensional images using a template matching-based approach to determine a location of the positioned automated guided vehicle relative to the substrate corresponding to the unknown location.

13. The method of claim 11 further comprising replacing a respective one of the two or more two-dimensional images from the controller corresponding to the first known location, the second known location, and each of the additional respective known locations along the predetermined path relative to the substrate surface with the first additional two-dimensional image, the second additional two-dimensional image, and each of the one or more additional two-dimensional images.

14. The method of claim 11, wherein prescanning a predefined length and width of a substrate surface and associating each one of the series of two or more two-dimensional images with a respective known location on the substrate surface, and storing each one of the series of two-dimensional images comprise:

positioning a scanning device having a scanning sensing device on a substrate surface;

prescanning a predefined length and width of the substrate surface with the scanning sensing device while moving the scanning device along the substrate surface between two or more locations within the predefined length and width to produce two or more two-dimensional images, with each one of said two or more two-dimensional images corresponding to a respective one of the two or more locations on the substrate surface within the predefined length and width;

associating each respective one of the two or more two-dimensional images with a corresponding respective location on the substrate surface within the predefined length and width using a location association device; and storing the two or more two-dimensional images on the scanning device.

15. The method of claim 14 further comprising transferring the two or more two-dimensional images from the scanning device to the controller of the automated guided vehicle.

16. A method for controlling a movement of an automated guided vehicle relative to a substrate, the automated guided vehicle including a sensing device coupled to a controller, said method comprising:

prescanning a predefined length and width of a substrate surface of the substrate to produce a series of two or more two-dimensional images, each respective one of said series of two or more two-dimensional images corresponding to a different respective location on the substrate surface within the predefined length and width;

associating each one of the series of two or more two-dimensional images with a respective known location on the substrate surface;

storing each one of the series of two-dimensional images within the controller of the automated guided vehicle;

positioning the automated guided vehicle in a first known location within the predefined length and width relative to the substrate surface;

scanning the substrate surface at the first known location with the sensing device to produce a first additional two-dimensional image;

associating the first additional two-dimensional image with the first known location on the substrate surface;

moving the automated guided vehicle along a predetermined path relative to the substrate surface and at a predetermined speed from the first known location to a second known location;

scanning the substrate surface at predetermined time intervals with the sensing device during said step of moving the automated guided vehicle to produce a series of one or more additional two-dimensional images, with each one of the series of one or more additional two-dimensional images corresponding to an respective additional known location between the first and second known location;

associating each of the series of one or more additional two-dimensional images with the respective additional known location on the substrate surface;

scanning the substrate surface at the second known location with the sensing device to produce a second additional two-dimensional image;

associating the second additional two-dimensional image with the second known location on the substrate surface;

storing the first additional two-dimensional image, the second additional two-dimensional image, and each of the one or more additional two-dimensional images within the controller of the automated guided vehicle;

positioning the automated guided vehicle in an unknown location within the predefined length and width relative to the substrate surface;

scanning the substrate surface corresponding to the unknown location with the sensing device to produce an supplemental two-dimensional image;

comparing the supplemental two-dimensional image to each of the series of two or more two-dimensional images, the first additional two-dimensional image, the second additional two-dimensional image, and each of the one or more additional two-dimensional images to determine a location of the positioned automated guided vehicle relative to the substrate corresponding to the unknown location;

determining a path of movement for the automated guided vehicle from the determined location corresponding to the unknown location to a position along the predetermined path; and moving the automated guided vehicle along the path of movement from the determined location corresponding to the unknown location to the position along the predetermined path, wherein each different respective location corresponding to a respective one of the two or more two-dimensional images defines a two-dimensional grid of a predefined grid length and predefined grid width within the substrate surface.

17. The method of claim 16, wherein a degree of overlap between the two-dimensional images of an adjacent pair of the two-dimensional grids ranges from 0% overlap to 99.9% overlap.

\* \* \* \* \*